United States Patent
Ono

(10) Patent No.: US 12,022,033 B1
(45) Date of Patent: Jun. 25, 2024

(54) IMAGE FORMING APPARATUS AND ORIGINAL DETERMINATION METHOD

(71) Applicant: Toshiba Tec Kabushiki Kaisha, Tokyo (JP)

(72) Inventor: Shinji Ono, Mishima Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 18/490,258

(22) Filed: Oct. 19, 2023

(30) Foreign Application Priority Data

Jan. 11, 2023 (JP) ................................ 2023-002501

(51) Int. Cl.
*H04N 1/00* (2006.01)

(52) U.S. Cl.
CPC ..... *H04N 1/00092* (2013.01); *H04N 1/00005* (2013.01); *H04N 1/00037* (2013.01); *H04N 1/00039* (2013.01); *H04N 1/00047* (2013.01); *H04N 1/0009* (2013.01)

(58) Field of Classification Search
CPC .......... H04N 1/00092; H04N 1/00005; H04N 1/00037; H04N 1/00039; H04N 1/00047; H04N 1/0009
See application file for complete search history.

(56) References Cited

U.S. PATENT DOCUMENTS

| | | | |
|---|---|---|---|
| 5,440,409 A | 8/1995 | Sugano et al. | |
| 7,720,290 B2* | 5/2010 | Shimura | H04N 1/00838 382/148 |
| 2006/0109515 A1* | 5/2006 | Zhao | G09C 5/00 382/100 |
| 2015/0220819 A1 | 8/2015 | Yamamoto et al. | |
| 2022/0014633 A1* | 1/2022 | Miyagawa | H04N 1/00045 |
| 2022/0206424 A1* | 6/2022 | Tanaka | G03G 15/5087 |

FOREIGN PATENT DOCUMENTS

JP 2000-330424 A 11/2000

* cited by examiner

*Primary Examiner* — Quang N Vo
(74) *Attorney, Agent, or Firm* — Kim & Stewart LLP

(57) ABSTRACT

According to an embodiment, an image forming apparatus stores in a storage device an original identification image included in the original image. The image forming apparatus scans a determination target image and detects a determination target identification image of the determination target image. The image forming apparatus compares the stored original identification image with the determination target identification image and determines whether or not the determination target identification image is the original image.

8 Claims, 7 Drawing Sheets

|  | R | G | B |
|---|---|---|---|
| Patch 201 | 224.97 | 230.3 | 237.46 |
| Patch 202 | 215.18 | 203.17 | 205.29 |
| Patch 203 | 183.48 | 123.72 | 116.07 |

Fig.5

IMAGE FORMING APPARATUS AND ORIGINAL DETERMINATION METHOD

CROSS-REFERENCE TO RELATED APPLICATIONS

This application is based upon and claims the benefit of priority from the prior Japanese Patent Application No. 2023-2501, filed on Jan. 11, 2023, the entire contents of which are incorporated herein by reference.

FIELD

Embodiments described herein generally relate to an image forming apparatus and an original determination method.

BACKGROUND

Various technologies have been proposed for managing an original for a printed document. For example, there have been employed an approach of applying a barcode or radio frequency identification (RFID) to a printed document of an original and an approach of determining a printed document with a pattern as the original.

However, it is difficult to easily determine whether a document to be printed is an original or copy even with those approaches. There is still room for improvement.

For example, it takes time for the user to check a document to be printed with eyes, and it is cumbersome for the user to check a number of documents to be printed one by one. In a case of using an RFID for example, a reader as well as the RFID are necessary, which increases the introduction cost.

BRIEF DESCRIPTION OF THE DRAWINGS

FIG. 5 is a diagram showing an example of registration data of an original identification image according to the embodiment.

DETAILED DESCRIPTION

Figure 1:
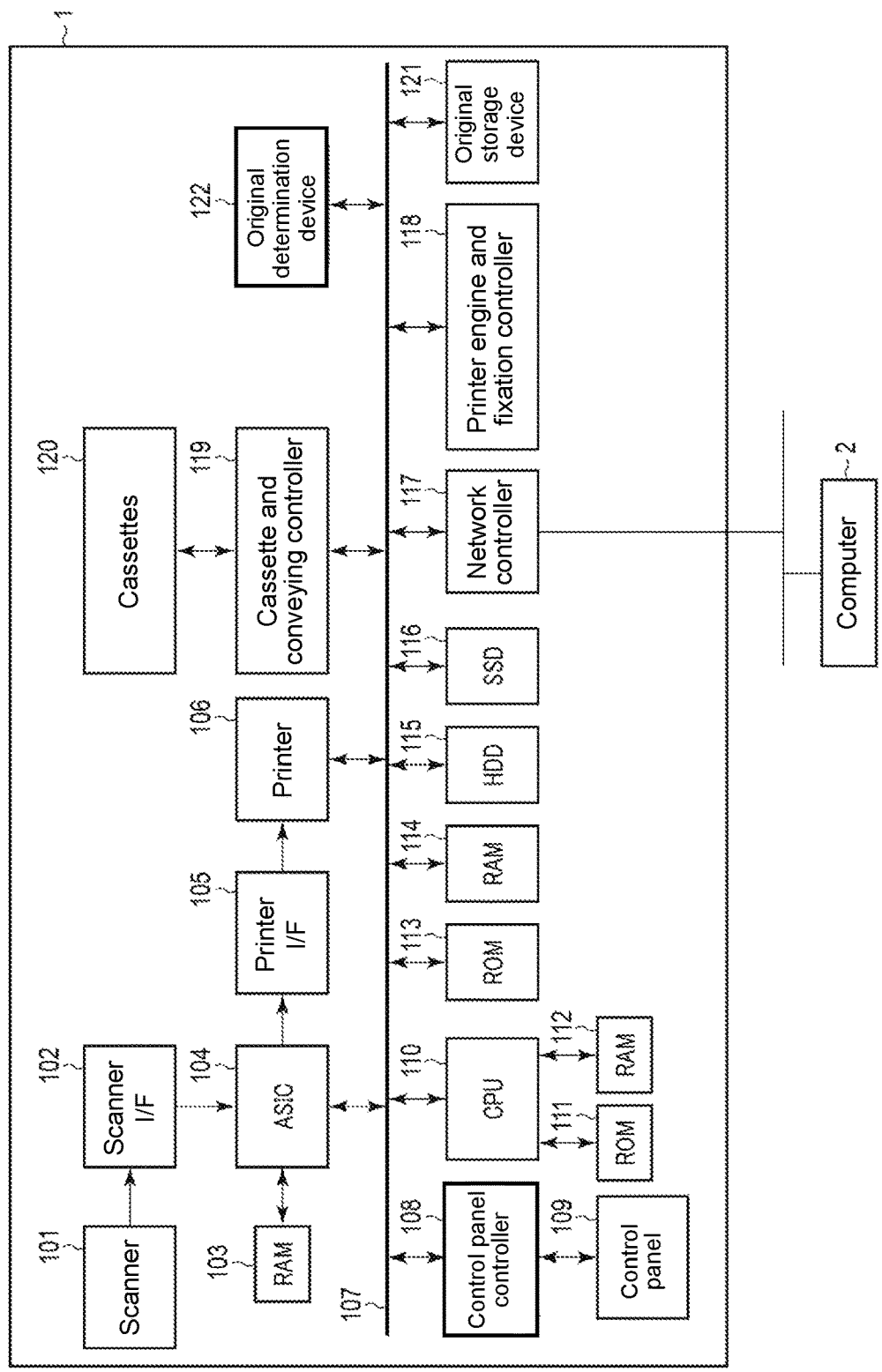
FIG. 1 is a block diagram showing an example of a system configuration of an image forming apparatus according to an embodiment.

In accordance with one embodiment, an image forming apparatus includes an image forming device, an image scanning device, a detection device, a storage device, a determination device, and an output device. The image forming device forms an image including an identification image. The formed image is an original image or a determination target image. The original image includes an original identification image as the identification image. The determination target image includes a determination target identification image as the identification image. The image scanning device scans the original image or the determination target image and outputs scan data of the original image or the determination target image. The detection device detects the original identification image from the scan data of the original image and detects the determination target identification image from determination target scan data of the determination target image. The storage device stores the original identification image. The determination device compares the original identification image stored in the storage device with the determination target identification image and determines whether or not the determination target image is the original image on the basis of the comparison. The output device outputs a determination result obtained by the determination device.

Hereinafter, embodiments will be described with reference to the drawings. It should be noted that in each of the drawings used in the following description of the embodiment, the scales of the respective portions are changed as appropriate. Moreover, in each of the drawings used in the following description of the embodiment, some configurations are omitted as appropriate for the sake of description. Moreover, in the drawings, the same reference signs denote the same or similar portions.

[Configuration]

FIG. 1 is a block diagram showing an example of a system configuration of an image forming apparatus according to an embodiment. The image forming apparatus is placed in a work place or the like for use. As shown in FIG. 1, an image forming apparatus 1 includes a scanner 101, a scanner interface (I/F) 102, a random access memory (RAM) 103, an application specific integrated circuit (ASIC) 104, a printer I/F 105, a printer 106, a communication channel 107, a control panel controller 108, a control panel 109, a central processing unit (CPU) 110, a read only memory (ROM) 111, a RAM 112, a ROM 113, a RAM 114, a hard disk drive (HDD) 115, a solid state drive (SSD) 116, a network controller 117, a printer engine and fixation controller 118, a cassette and conveying controller 119, a plurality of cassettes 120, an original storage device 121, and an original determination device 122.

The respective portions of the image forming apparatus 1 are connected via the communication channel 107 and exchange control signals and image data, for example.

The scanner 101 scans an image of an original document set on an original document table and outputs scan data corresponding to the image of the original document. Moreover, the scanner 101 has an auto document feeder (ADF). The ADF feeds a plurality of original documents onto the original document table one by one. The scanner 101 scans an image of each original document fed from the ADF and outputs the scanned image data corresponding to the image of the original document. The use of the ADF enables easy scanning of a plurality of original document images. The scanner I/F 102 inputs the scan data output from the scanner 101 and outputs it to the ASIC 104.

The original document scanned by the scanner 101 is an original image or a determination target image. Moreover, the determination target image is an original image or a copy image of the original image.

The ASIC 104 receives the scan data output from the scanner 101, temporarily saves it on the RAM 103, and converts the scan data read from the RAM 103 into output image data. Moreover, the ASIC 104 receives print data sent from a personal computer or the like (hereinafter, referred to as a terminal device) via the network controller 117, temporarily saves it on the RAM 103, and converts the print data read from the RAM 103 into output image data.

The printer I/F 105 inputs the output image data output from the ASIC 104 and outputs it to the printer 106. The printer 106 forms an image based on the output image data output from the printer I/F 105. For example, the printer 106 forms an original image on the basis of the output image data corresponding to the print data received via the network controller 117. Moreover, the printer 106 forms a copy image on the basis of the output image data corresponding to the scan data received via the scanner 101.

The control panel controller 108 controls information output or the like via the control panel 109 under the control by the CPU 110. Moreover, the control panel controller 108 detects input information from the control panel 109 and notifies the CPU 110 of the input information. The control panel 109 has a display device and an input device. The control panel 109 displays various types of information via the display device. The control panel 109 receives the input of information via the input device.

The CPU 110 operates according to a program stored in the ROM 111, scans an image obtained by the scanner 101, and controls for example formation of an image obtained by the printer 106. The RAM 112 temporarily stores data along with the operation of the CPU 110. The ROM 113 stores operation programs, parameters, and the like to be used in the respective portions. The RAM 114 stores temporary data to be used in the respective portions. The HDD 115 and the SSD 116 store the scan data output from the scanner 101 and the print data sent from the terminal device.

The network controller 117 connects to an external apparatus such as a terminal device or cloud server via a network and receives the print data. The printer engine and fixation controller 118 controls image formation by the printer 106 and also controls a heater such as a fixation device. The cassette and conveying controller 119 selects a predetermined cassette 120 from the plurality of cassettes 120, conveys a sheet stored in the selected cassette to the printer 106, and conveys the sheet having an image formed by the printer 106 to a delivery unit. The plurality of cassettes 120 stores sheets for each size.

The original storage device 121 registers an original identification image. The registration of the original identification image will be described later in detail. The original determination device 122 determines whether or not the determination target image scanned by the scanner 101 is the original image.

The printer 106 corresponds to at least a portion of the image forming device. The printer 106 forms the original image including the identification image. The scanner 101 corresponds to at least a portion of the image scanning device. The scanner 101 scans the original image or the determination target image. The ASIC 104 corresponds to at least a portion of the detection device. The ASIC 104 detects the original identification image from original scan data of the original image and detects the determination target identification image from determination target scan data of the determination target image. The original storage device 121 corresponds to at least a portion of the storage device. The original storage device 121 registers the original identification image. The original determination device 122 corresponds to at least a portion of the determination device. The original determination device 122 determines whether or not the determination target image is the original image on the basis of a comparison of the original identification image with the determination target identification image. The control panel 109 corresponds to at least a portion of the output device. The control panel 109 outputs a determination result.

[Original Image and Copy Image]

Figure 2:
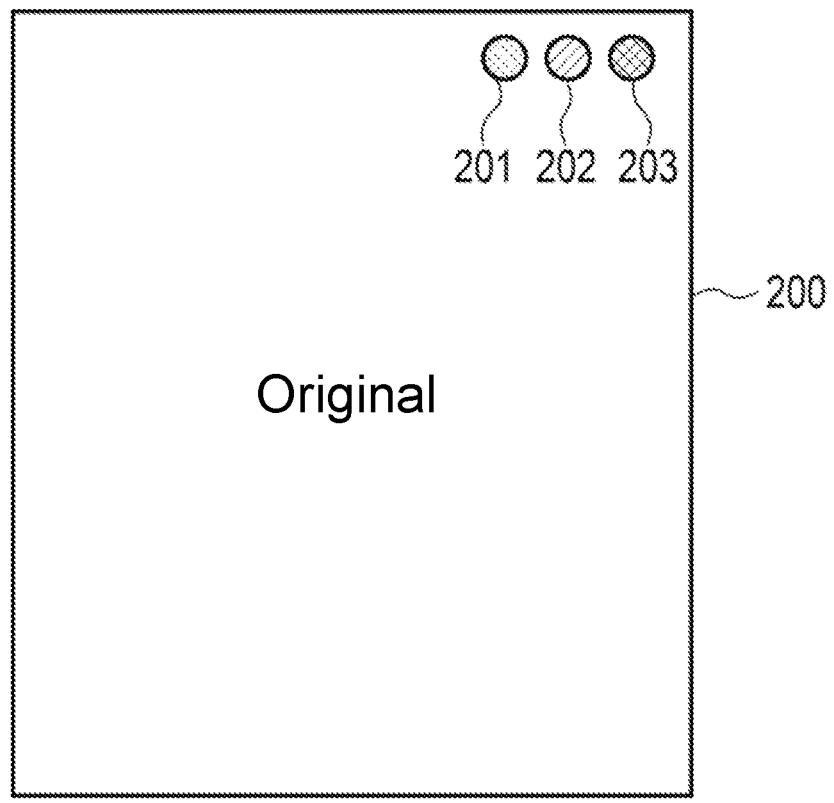
FIG. 2 is a view showing an example of an original image according to the embodiment.
Figure 3:
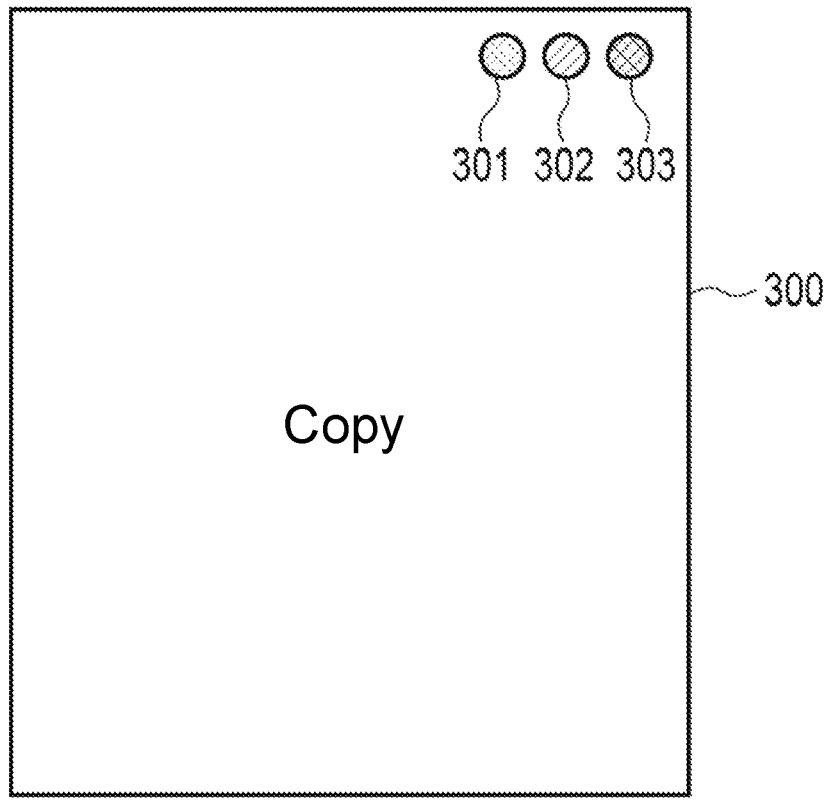
FIG. 3 is a view showing a copy image according to the embodiment.

FIG. 2 is a view showing an example of the original image according to the embodiment. FIG. 3 is a view showing a copy image according to the embodiment. For example, after receiving an instruction to print the original, the ASIC 104 receives print data via the network controller 117, generates identification image data for identifying the original, and generates original output image data on the basis of the print data and the identification image data.

The printer 106 prints (forms) an original image including an identification image in multiple colors on the basis of the original output image data. In other words, the identification image in multiple colors is embedded in the printed original document image.

For example, the identification image includes a plurality of patches and the patches have different colors. As shown in FIG. 2, an original image 200 includes patches 201, 202, and 203. The patches 201, 202, and 203 each include red, green, and blue (RGB) components. Although the identification image including the three patches is described in the present embodiment, it is sufficient that the identification image includes one or more patches.

The instruction to print the original may be an instruction from the terminal device via the network controller 117 or may be an instruction from the control panel 109. The print data is data about an original form such as a contract or specification document. For example, the original form includes position data of the identification image. The ASIC 104 generates original output image data on the basis of the print data, the identification image data, and the position data of the identification image. The original image printed by the printer 106 includes the identification image at a predetermined position specified by the position data.

It should be noted that instead of the ASIC 104, the CPU 110 may generate identification image data for identifying the original. Alternatively, the network controller 117 may receive the identification image data rather than the ASIC 104 or the CPU 110 generating the identification image data. In this case, the ASIC 104 generates the original output image data on the basis of the received identification image data.

For example, another image forming apparatus (hereinafter, referred to as the other copy machine) different from the image forming apparatus 1 copies the original image shown in FIG. 2. As a result, a copy image shown in FIG. 3 is generated. As shown in FIG. 3, a copy image 300 includes patches 301, 302, and 303.

It is difficult to distinguish the original image shown in FIG. 2 from the copy image shown in FIG. 3 with eyes. However, an individual difference (specific difference) between the image forming apparatus 1 and the other copy machine causes a difference in color tone between the original image shown in FIG. 2 and the copy image shown in FIG. 3. The image forming apparatus 1 according to the present embodiment is capable of capturing the copy image shown in FIG. 3 as the determination target image and determining that the determination target image is not the original document image (original image). It will be described below in detail.

[Original Image Registration]

Figure 4:
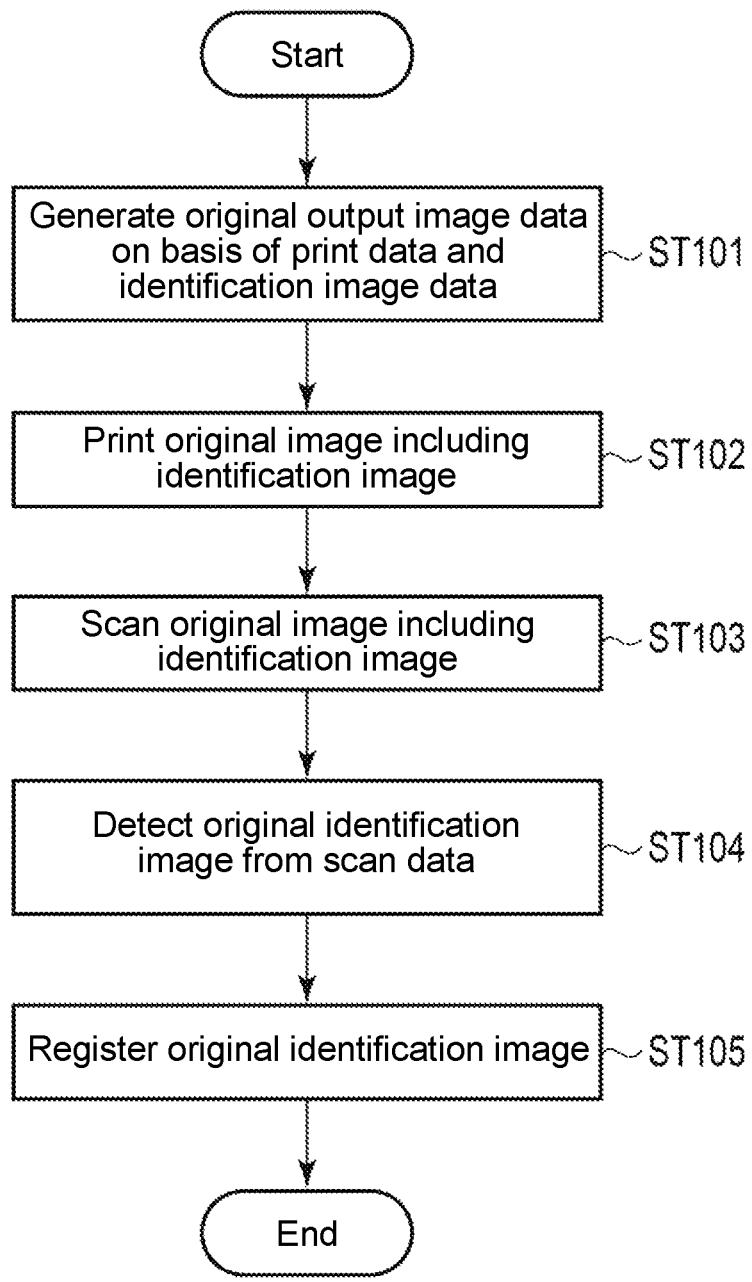
FIG. 4 is a flowchart showing an example of original image output and original image registration according to the embodiment.

FIG. 4 is a flowchart showing an example of original image output and original image registration according to the embodiment. As shown in FIG. 4, in Step ST101, after receiving an instruction to print the original, the ASIC 104 receives print data via the network controller 117, generates identification image data for identifying the original, and generates original output image data on the basis of the print data and the identification image data.

In Step ST102, the printer 106 prints (forms) an original image including an identification image on the basis of the generated original output image data. For example, the identification image includes the patches 201, 202, and 203.

In Step ST103, the scanner 101 scans the original image set on the original document table or ADF. In Step ST104, the ASIC 104 detects the original identification image from the scan data output from the scanner 101. In Step ST105, the original storage device 121 registers the original identification image.

For example, in Step ST104, the ASIC 104 retains a template corresponding to the identification image data and detects the original identification image from the scan data on the basis of the template. It should be noted that the ASIC 104 may detect the original identification image from the scan data on the basis of the position data of the identification image included in the original form. The use of the position data enables improvement of the detection accuracy of the original identification image.

FIG. 5 is a diagram showing an example of registration data of the original identification image according to the embodiment. The patches 201, 202, and 203 each include RGB components. As shown in FIG. 5, the registration data include RGB values of the patches 201, 202, and 203. The printer 106 has an individual difference in output characteristics. Moreover, the scanner 101 has an individual difference in input characteristics. Such output characteristics and input characteristics are reflected on the registration data.

[Original Determination]

Figure 6:
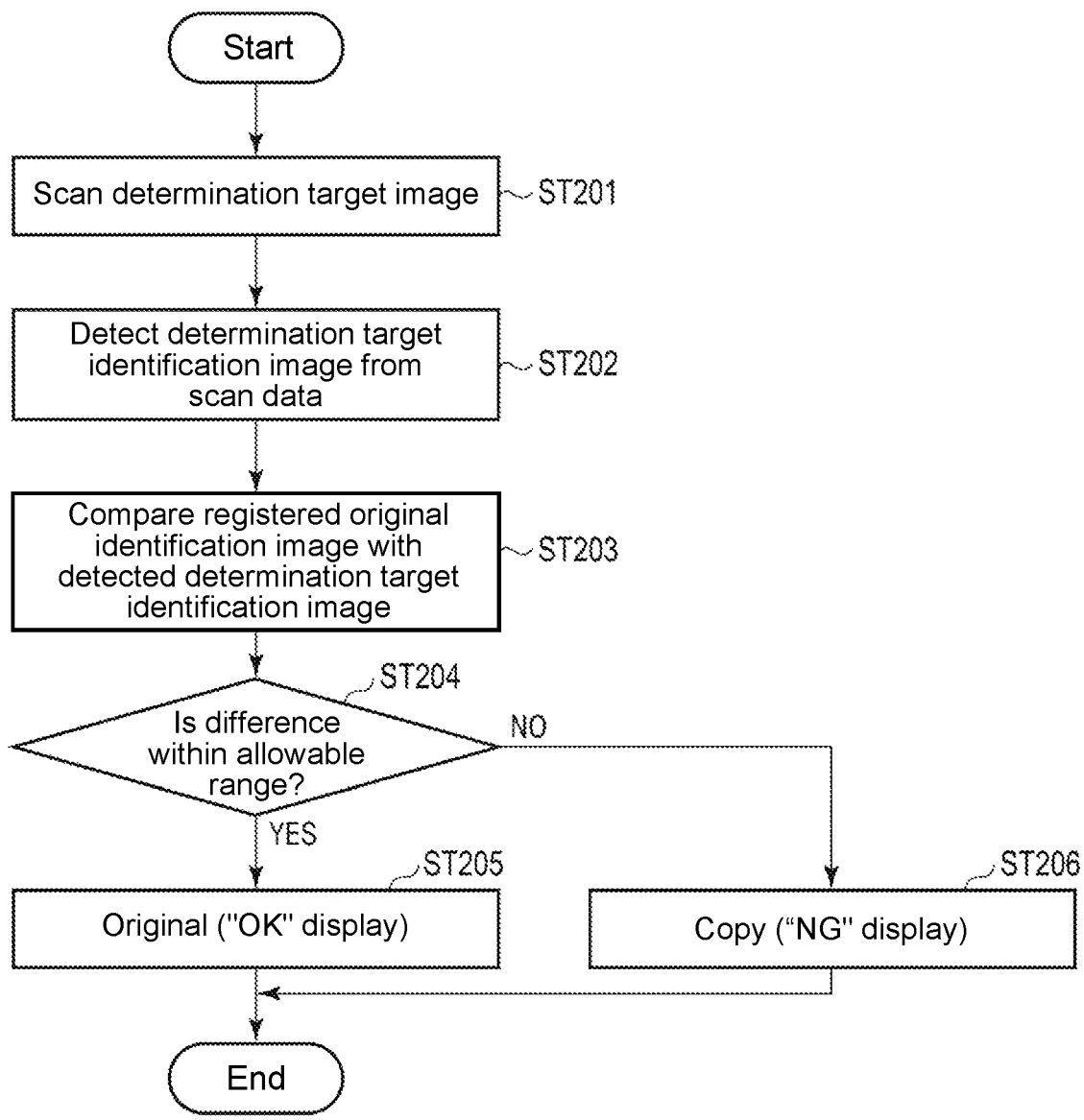
FIG. 6 is a flowchart showing an example of original determination according to the embodiment.

FIG. 6 is a flowchart showing an example of original determination according to an embodiment. As shown in FIG. 6, in Step ST201, the scanner 101 scans the determination target image set on the original document table or ADF. In Step ST202, the ASIC 104 detects the determination target identification image from the scan data output from the scanner 101.

In Step ST203, the original determination device 122 compares the original identification image (see Step ST105 in FIG. 4) registered in the original storage device 121 with the determination target identification image detected from the scan data. Then, in Step ST204, the original determination device 122 determines whether or not the determination target image is the original image on the basis of the comparison.

That is, the original determination device 122 generates a determination result on the basis of a difference between the colors of the plurality of patches included in the original identification image and the colors of the plurality of patches included in the determination target identification image. For example, the original determination device 122 assesses the difference on the basis of an allowable range depending on the scan performance of the scanner 101 and generates a determination result.

The scan accuracy of the scanner 101 can have an error. In a manufacturing process for the image forming apparatus 1, an allowable range that allows a scan error of the scanner 101 is set on the basis of the error. The original determination device 122 or the HDD 115 for example stores the allowable range.

In a case where the difference between the colors of the plurality of patches included in the original identification image and the colors of the plurality of patches included in the determination target identification image is within the allowable range (ST204, YES), the original determination device 122 determines that the determination target image is the original and generates a determination result indicating that the determination target image is the original.

Figure 7:
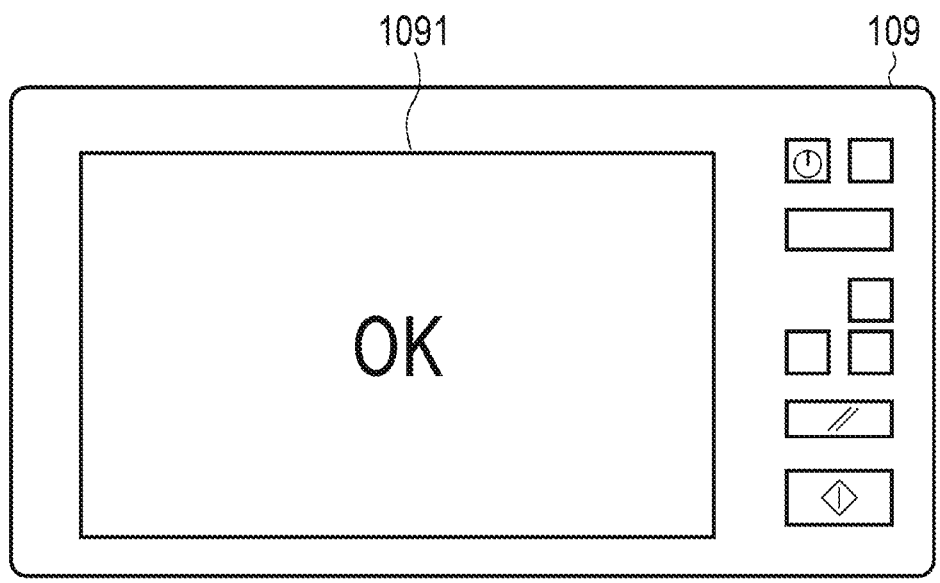
FIG. 7 is a view showing a screen display example of a control panel according to the embodiment.

In ST205, the control panel controller 108 controls the control panel 109 to output the determination result on the basis of the determination result indicating that the determination target image is the original. FIG. 7 is a view showing a screen display example of a control panel according to the embodiment. The control panel 109 displays "OK" for example as the determination result indicating that the determination target image is the original.

In a case where the difference between the colors of the plurality of patches included in the original identification image and the colors of the plurality of patches included in the determination target identification image exceeds the allowable range (ST204, NO), the original determination device 122 determines the determination target image as a copy and generates a determination result indicating that the determination target image is the copy.

In Step ST206, the control panel controller 108 controls the control panel 109 to output the determination result on the basis of the determination result indicating that the determination target image is the copy. The control panel 109 displays "NG" for example as the determination result indicating that the determination target image is the copy.

It should be noted that the control panel 109 may display an assessment result of the difference between the colors of the plurality of patches included in the original identification image and the colors of the plurality of patches included in the determination target identification image. For example, the control panel 109 may display an assessment result indicating the probability of being the original as a numeric value or an image. That is, the control panel 109 may display the probability that the determination target image is the original to be 90% or 20%.

[Identification of Plurality of Original Images]

For example, in a case of forming a plurality of original images, the image forming apparatus 1 may include a different identification image in each original image so that the plurality of original images can be identified on the basis of common print image data. Accordingly, in a case where a plurality of identical original images has been generated, the image forming apparatus 1 is capable of checking whether each determination target image is an original or copy while distinguishing the original images from one another.

For example, the printer 106 forms a first original image (original No. 001) including a first identification image and a second original image (original No. 002) including a second identification image on the basis of print image data (e.g., a document A). The scanner 101 scans the first original image set on the original document table or ADF and detects the first original identification image from the first scan data. The original storage device 121 registers the first original identification image (original identification number 001). Furthermore, the scanner 101 scans the second original image set on the original document table or ADF and detects the second original identification image from the second scan data. The original storage device 121 registers the second original identification image (original identification number 002).

The scanner 101 scans the determination target image set on the original document table or ADF. The ASIC 104 detects the determination target identification image from the scan data output from the scanner 101. In a case where the difference is within the allowable range on the basis of a comparison of the first original identification image registered in the original storage device 121 with the determination target identification image detected from the scan data, the original determination device 122 determines that the determination target image is the first original image and generates a determination result indicating that the determination target image is the first original image. The control panel 109 displays the determination result (original No. 001) indicating that the determination target image is the first original image. The user is able to confirm that the determination target image is the original image as the original No. 001 via the control panel 109.

Moreover, in a case where the difference is within the allowable range on the basis of a comparison of the second original identification image registered in the original storage device 121 with the determination target identification image detected from the scan data, the original determination device 122 determines that the determination target image is the second original image and generates a determination result indicating that the determination target image is the second original image. The control panel 109 displays a determination result (original No. 002) indicating that the determination target image is the second original image. The user is able to confirm that the determination target image is the original image as the original No. 002 via the control panel 109.

Moreover, in a case where the difference exceeds the allowable range in either comparison, the original determination device 122 determines the determination target image as a copy image and generates a determination result indicating that the determination target image is the copy image. The control panel 109 displays the determination result indicating that the determination target image is the copy image.

Alternatively, in a case of forming a plurality of different original images on the basis of a plurality of different pieces of print image data, the image forming apparatus 1 may include different identification images in the plurality of different original images so that the plurality of different original images can be each identified. Accordingly, in a case where a plurality of different original images has been generated, the image forming apparatus 1 is capable of checking whether each determination target image is an original or copy while distinguishing the original images from one another.

For example, the printer 106 forms a first original image (original No. 001) including a first identification image on the basis of first print image data (e.g., a document A) and forms a second original image (original No. 002) including a second identification image on the basis of second print image data (e.g., a document B). The scanner 101 scans the first original image set on the original document table or ADF and detects the first original identification image from the first scan data. The original storage device 121 registers the first original identification image (original identification number 001). Furthermore, the scanner 101 scans the second original image set on the original document table or ADF and detects the second original identification image from the second scan data. The original storage device 121 registers the second original identification image (original identification number 002).

The scanner 101 scans the determination target image set on the original document table or ADF. The ASIC 104 detects the determination target identification image from the scan data output from the scanner 101. In a case where the difference is within the allowable range on the basis of a comparison of the first original identification image registered in the original storage device 121 with the determination target identification image detected from the scan data, the original determination device 122 determines that the determination target image is the first original image, and generates a determination result indicating that the determination target image is the first original image. The control panel 109 displays the determination result (original No. 001) indicating that the determination target image is the first original image. The user is able to confirm that the determination target image is the original image as the original No. 001 via the control panel 109.

Moreover, in a case where the difference is within the allowable range on the basis of a comparison of the second original identification image registered in the original storage device 121 with the determination target identification image detected from the scan data, the original determination device 122 determines that the determination target image is the second original image and generates a determination result indicating that the determination target image is the second original image. The control panel 109 displays a determination result (original No. 002) indicating that the determination target image is the second original image. The user is able to confirm that the determination target image is the original image as the original No. 002 via the control panel 109.

Moreover, in a case where the difference exceeds the allowable range in either comparison, the original determination device 122 determines the determination target image as a copy image and generates a determination result indicating that the determination target image is the copy image. The control panel 109 displays the determination result indicating that the determination target image is the copy image. In the above-mentioned manner, the image forming apparatus 1 enables identification of each original image.

[Identification Information Position]

For example, the image forming apparatus 1 may include the identification information at a specified position on the original image. The terminal device that outputs the print data displays an original form such as a contract or specification document. For example, the terminal device displays a plurality of original forms in which the positions of the identification image are different. A first original form includes first position data to arrange the identification image at a first position and a second original form includes second position data to arrange the identification image at a second position. The terminal device sends to the image forming apparatus 1 an instruction to print the original, the instruction including print data with the first or second original form selected by the user.

The printer 106 of the image forming apparatus 1 forms the first original image including the identification image in the first position on the basis of the first original form. The scanner 101 scans the first original image set on the original document table or ADF and detects the first original identification image from the first scan data on the basis of the first position data. The original storage device 121 registers the first original identification image.

Similarly, the printer 106 forms the second original image including the identification image at the second position on the basis of the second original form. The scanner 101 scans the second original image set on the original document table or ADF, detects the second original identification image from the second scan data on the basis of the second position data, and the original storage device 121 registers the second original identification image.

The scanner 101 scans the determination target image set on the original document table or ADF. The ASIC 104 detects the determination target identification image from the scan data output from the scanner 101 on the basis of the first and second position data.

In a case where the difference is within the allowable range on the basis of a comparison of the first original identification image registered in the original storage device 121 with the determination target identification image detected from the scan data, the original determination device 122 determines that the determination target image is the first original image and generates a determination result indicating that the determination target image is the first original image. The control panel 109 displays the determination result indicating that the determination target image is the first original image.

Moreover, in a case where the difference is within the allowable range on the basis of a comparison of the second original identification image registered in the original storage device 121 with the determination target identification image detected from the scan data, the original determination device 122 determines that the determination target image is the second original image and generates a determination result indicating that the determination target image is the second original image. The control panel 109 displays the determination result indicating that the determination target image is the second original image. The image forming apparatus 1 enables improvement of the detection accuracy of the original identification image by using the position data. More accurate original determination is thus achieved.

As described above, the image forming apparatus 1 determines whether or not the determination target image is the original image on the basis of the comparison of the registered original identification image with the determination target identification image detected from the determination target scan data of the determination target image, and outputs the determination result. With the image forming apparatus 1, a true/false determination as to a document to be printed can be made without any burden on the user.

For example, the image forming apparatus 1 captures a plurality of determination target images set on the ADF and outputs true/false determination results. Accordingly, the burden on the user can be greatly reduced even in a case where a number of determination target images are used because it does not rely on the user's check with eyes. For example, in a case where the original determination device 122 determines that the determination target image is a copy, not an original, the cassette and conveying controller 119 discharges the determination target images captured by the ADF and temporarily stops capturing the determination target images by the ADF. Moreover, the control panel 109 displays a determination result indicating that the determination target image is the copy. The user is able to distinguish the last discharged determination target image as a copy document.

It should be noted that one or more processors may realize the ASIC 104, the CPU 110, and the original determination device 122 that serve to perform image formation and original determination according to the present embodiment. Moreover, the programs executed by the one or more processors may be transferred in a state stored in an electronic apparatus such as the image forming apparatus 1 or may be transferred in a state not stored in the electronic apparatus. In the latter case, the programs may be transferred via a network or may be transferred in a state stored in a storage medium. The storage medium is a non-transitory tangible medium. The storage medium is a computer-readable medium. Any type of storage medium such as an optical disc or memory card can be employed as long as the medium can store the programs and can be read by a computer. The electronic apparatus downloads the programs transferred (provided) via the network and installs them to the memory or scans the programs from the storage medium and installs them to the memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
   an image forming device that forms an image including an identification image, the formed image being an original image or a determination target image, the original image including an original identification image as the identification image, and the determination target image including a determination target identification image as the identification image;
   an image scanning device that scans the original image or the determination target image and outputs scan data of the original image or the determination target image;
   a detection device that detects the original identification image from the scan data of the original image and detects the determination target identification image from determination target scan data of the determination target image;
   a storage device that stores the original identification image;
   a determination device that compares the original identification image stored in the storage device with the determination target identification image and determines whether or not the determination target image is the original image on the basis of the comparison; and
   an output device that outputs a determination result obtained by the determination device; wherein
   the image scanning device scans the determination target image formed by another image forming apparatus, and
   the detection device detects the determination target identification image of the determination target image formed by the other image forming apparatus; wherein the
   determination device compares the determination target identification image of the determination target image formed by the other image forming apparatus with the original identification image stored in the storage device and determines whether or not the determination target image formed by the other image forming apparatus is the original image on the basis of the comparison.

2. The image forming apparatus according to claim 1, wherein
   the image forming device forms the original image including the identification image in multiple colors.

3. The image forming apparatus according to claim 2, wherein
   the identification image includes a plurality of patches and the patches have different colors.

4. The image forming apparatus according to claim 3, wherein the determination device generates the determination result on the basis of a difference between colors of a plurality of patches included in the original identification image and colors of a plurality of patches included in the determination target identification image.

5. The image forming apparatus according to claim 1, wherein
the storage device stores a plurality of original identification images, the plurality of original identification images being an identification image of each of a plurality of different original images.

6. The image forming apparatus according to claim 5, wherein
the determination device compares each of the plurality of original identification images stored in the storage device with the determination target identification image and determines which original image of the plurality of original images the determination target image is on the basis of the comparison.

7. The image forming apparatus according to claim 6, wherein
the output device outputs the determination result obtained by the determination device including which original image of the plurality of original images the determination target image is.

8. An original determination method for an image forming apparatus, comprising:
forming, by an image forming device, an image including an identification image, the formed image being an original image or a determination target image, the original image including an original identification image as the identification image, and the determination target image including a determination target identification image as the identification image;
scanning, by an image scanning device, the original image or the determination target image and outputting scan data of the original image or the determination target image;
detecting, by a detection device, the original identification image from the scan data of the original image and detecting the determination target identification image from determination target scan data of the determination target image;
storing, by a storage device, the original identification image;
comparing, by a determination device, the original identification image stored in the storage device with the determination target identification image and determining whether or not the determination target image is the original image on the basis of the comparison; and
outputting, by an output device, a determination result obtained by the determination device; .
the image scanning device scans the determination target image formed by another image forming apparatus, and
the detection device detects the determination target identification image of the determination target image formed by the other image forming apparatus; wherein the
determination device compares the determination target identification image of the determination target image formed by the other image forming apparatus with the original identification image stored in the storage device and determines whether or not the determination target image formed by the other image forming apparatus is the original image on the basis of the comparison.

\* \* \* \* \*